(12) United States Patent
Stucker

(10) Patent No.: US 8,121,280 B1
(45) Date of Patent: Feb. 21, 2012

(54) EXPEDITED CALL SETUP

(75) Inventor: Brian Stucker, Sashse, TX (US)

(73) Assignee: Rockstar Bidco, LP, New York, NY (US)

( * ) Notice: Subject to any disclaimer, the term of this patent is extended or adjusted under 35 U.S.C. 154(b) by 1429 days.

(21) Appl. No.: 11/615,468

(22) Filed: Dec. 22, 2006

(51) Int. Cl.
*H04M 3/42* (2006.01)
*H04M 1/64* (2006.01)
*H04L 12/66* (2006.01)

(52) U.S. Cl. ............... 379/207.16; 379/87; 379/211.02; 370/352

(58) Field of Classification Search ............ 379/211.02, 379/114.2, 45, 207.16, 142.01, 211.01, 215.01, 379/88.25, 76; 370/352; 709/227
See application file for complete search history.

(56) References Cited

U.S. PATENT DOCUMENTS

| | | | | |
|---|---|---|---|---|
| 7,587,031 | B1 * | 9/2009 | Ress et al. | 379/45 |
| 2006/0233333 | A1 * | 10/2006 | Brombal et al. | 379/114.2 |
| 2007/0153766 | A1 * | 7/2007 | Bienn et al. | 370/352 |
| 2008/0086566 | A1 * | 4/2008 | Kumarasamy et al. | 709/227 |

* cited by examiner

*Primary Examiner* — Thjuan K Addy
(74) *Attorney, Agent, or Firm* — Withrow & Terranova, PLLC

(57) ABSTRACT

An origination terminal initiates a call by providing a third party call control message in association with a traffic channel request. While the traffic channel is being established, the service node may initiate third party call control to initiate a call leg to the destination terminal on behalf of the origination terminal. As such, the destination call leg is initiated earlier. Since the destination call leg is initiated earlier, a corresponding ringback message indicating that a call is being presented to the called party is provided to the origination terminal sooner. When the ringback message is received quickly, a corresponding ringback indication may be presented to the caller in less time than was previously possible. The process is made even more efficient by waiting until the ringback message is received from the destination terminal before providing the SDP information, or communication information, for the origination terminal to the destination terminal.

22 Claims, 7 Drawing Sheets ated the call initiation attempt and immediately attempt to reinitiate the call. Such actions result in excessive use of radio access network resources, and the resultant delay frustrates callers.

EXPEDITED CALL SETUP

FIELD OF THE INVENTION

The present invention relates to telecommunications, and in particular to expediting the time in which a caller receives a ringback indicator after initiating a call.

BACKGROUND OF THE INVENTION

Given the rapid acceptance of packet-based communications, various underlying communication infrastructures are evolving to support packet communications. In particular, cellular networks are evolving to support packet communications over existing wireless access technologies. Regardless of whether additional cellular communications or packet-based communications are supported, a signaling channel and a traffic channel are established between a mobile terminal and a radio access network, which supports communications with the mobile terminal. The signaling channel is a relatively low data rate communications channel that allows the mobile terminal to exchange signaling messages with the radio access network to establish and control communication sessions, which may be traditional cellular communications or packet-based communications. For a communication session, the traffic channel supports the bearer path and may be used to transmit voice information using traditional cellular or packet-based techniques.

For packet-based communications, the mobile terminal generally plays a greater role in call signaling, and in particular, for establishing and controlling packet-based communication sessions involving the mobile terminal. The call signaling messages exchanged with the mobile terminal over the radio access network are relatively longer and more involved than the traditional cellular-based signaling messages. Given the relatively low data rates provided by the radio access network for signaling channels, excessive delays may be incurred during the establishment of a packet-based communication session.

A particularly problematic issue arises when there is an extended delay between the time a caller initiates a call and receives a ringback indicator, which indicates that the called party's terminal is ringing. Currently, the delay between initiating a call and receiving a ringback indicator is much longer than the delay to which callers have grown accustomed. Impatient callers often mistake the extra delay as a malfunction, and prematurely end the call initiation attempt and immediately attempt to reinitiate the call. Such actions result in excessive use of radio access network resources, and the resultant delay frustrates callers.

Accordingly, there is a need for an effective and efficient way to provide a ringback indicator to a caller in response to initiating a packet-based communication session from a mobile terminal.

SUMMARY OF THE INVENTION

The present invention allows an origination terminal to initiate a call by providing a third party call control message in association with a traffic channel request. While the traffic channel is being established, the service node may initiate third party call control to initiate a call leg to the destination terminal on behalf of the origination terminal. As such, the destination call leg is initiated earlier in the process. Since the destination call leg is initiated earlier, a corresponding ringback message indicating that a call is being presented to the called party is provided to the origination terminal sooner. When the ringback message is received quickly, a corresponding ringback indication may be presented to the caller in much less time than was previously possible. The process is made even more efficient by waiting until the ringback message is received from the destination terminal before providing the SDP information, or communication information, for the origination terminal to the destination terminal. As such, the transfer of the relatively data-intensive communication information over the signaling paths of the origination and destination radio access networks takes place over faster traffic channels instead of slower signaling channels.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention substantially reduces the time between a caller initiating a packet-based communication session and receiving a ringback indicator, which indicates that the session is being presented to a called party. The packet-based communication session may support a voice-based telephony call. The concepts of the present invention may be employed in any type of communication environment where a radio access network is coupled to a packet network to facilitate packet-based communications over a radio access channel provided by the radio access network.

Prior to delving into the details of the present invention, a communication environment is described in which packet-based communication sessions may be established over a radio access network and a packet network. Next, communication flows are presented to illustrate the difference between establishing a packet-based communication session according to the prior art and employing the present invention. In these examples, third party call control (3PCC) techniques are employed in a Third Generation Partnership Project version 2 (3GPP2) environment. As such, the invention may be employed in an Internet Protocol (IP) multimedia subsystem (IMS) that employs the Session Initiation Protocol (SIP) for session establishment and control. Those skilled in the art will recognize that the concepts of the present invention are applicable to other communication architectures using various communication protocols, without deviating from the teachings of the present invention.

Figure 1:
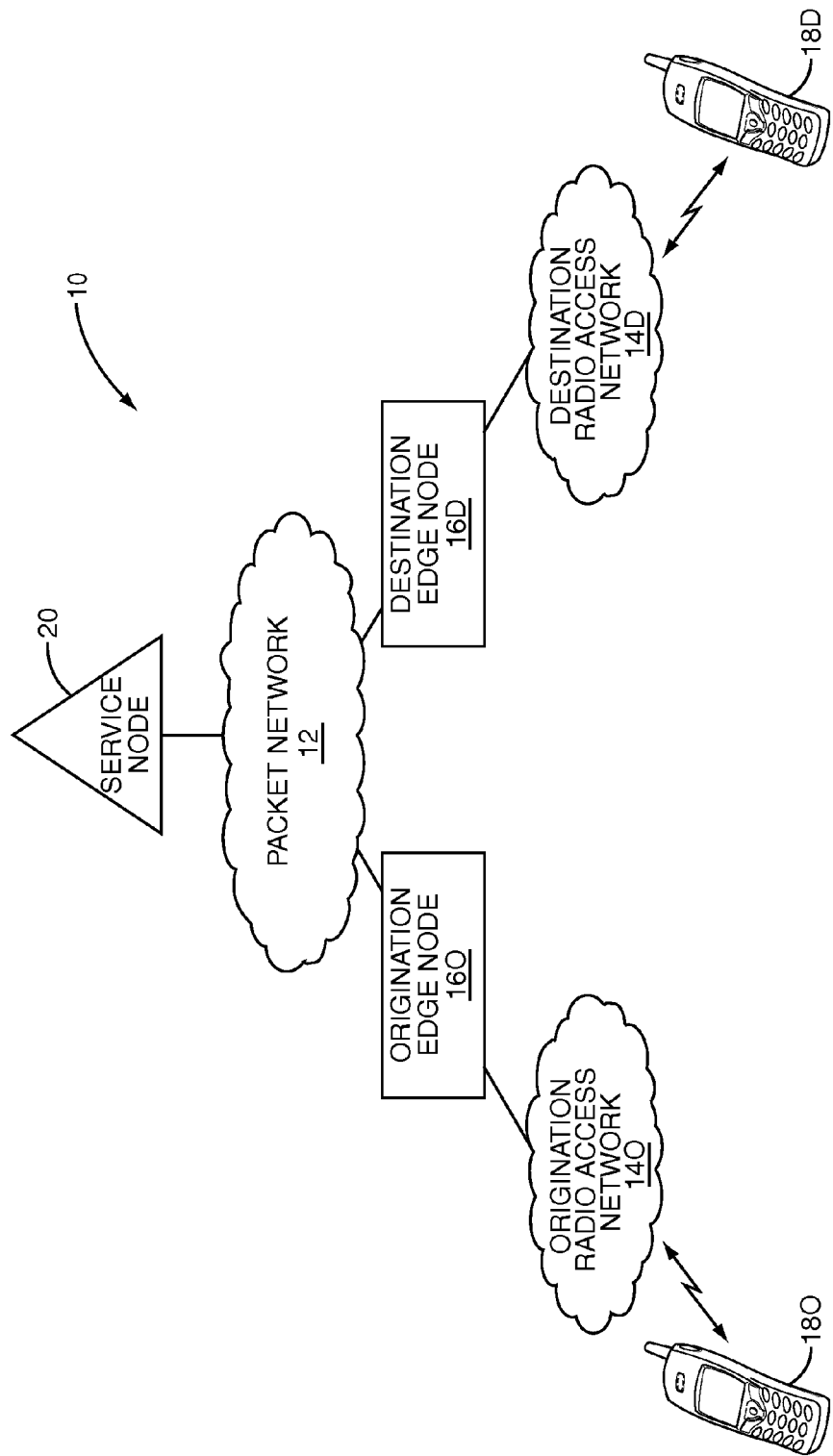
FIG. 1 illustrates a communication environment according to one embodiment of the present invention.

With reference to FIG. 1, a communication environment 10 is provided including a packet network 12, which interfaces directly or indirectly with any number of radio access networks 14, such as an origination radio access network 14O and a destination radio access network 14D. Although the respective radio access networks 14 may support all originations and terminations, the "origination" and "destination" modifiers are presented to avoid confusion in the following communication flows. The origination radio access network 14O is coupled to the packet network 12 over an appropriate origination edge node 16O, which may represent any type of communication entity or gateway providing a transition point between the origination radio access network 14O and the packet network 12. Similarly, the destination radio access network 14D is coupled to the packet network 12 by a destination edge node 16D. The origination radio access network 14O supports wireless communications with an origination terminal 18O, and the destination radio access network 14D supports wireless communications with a destination terminal 18D. In these examples, a caller will originate a call from the origination terminal 18O to a called party associated with the destination terminal 18D.

A service node 20 is provided in the packet network 12 to act as a call or application manager. Call signaling may be exchanged between the origination and destination edge nodes 16O and 16D via the service node 20. Call signaling between the origination edge node 16O and the origination terminal 18O as well as the destination edge node 16D and destination terminal 18D will ride on a signaling channel provided by the respective origination and destination radio access networks 14O, 14D.

Figure 2A:
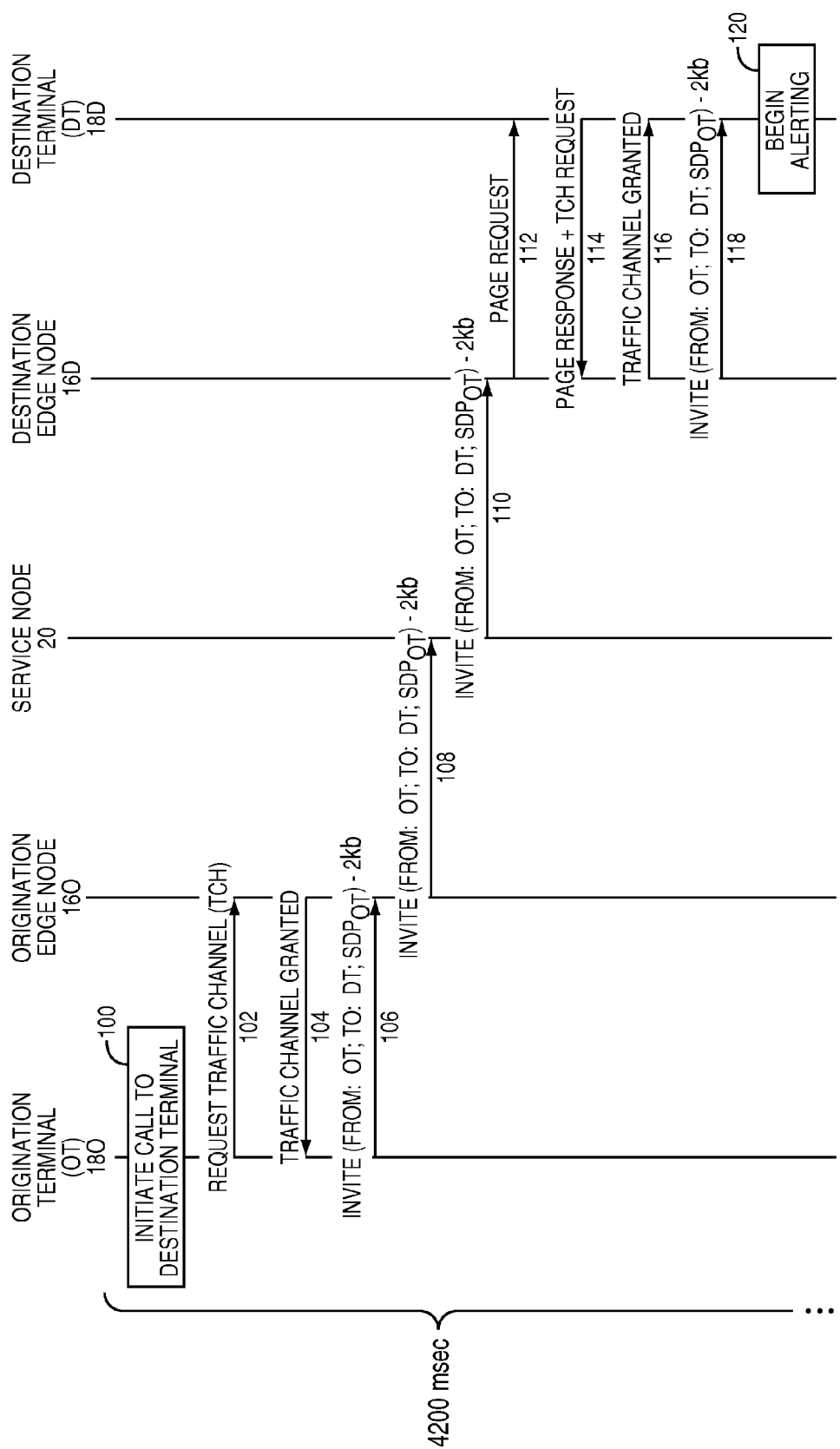
FIGS. 2A and 2B are a communication flow for establishing a packet-based communication session from a mobile terminal according to the prior art.
Figure 2B:
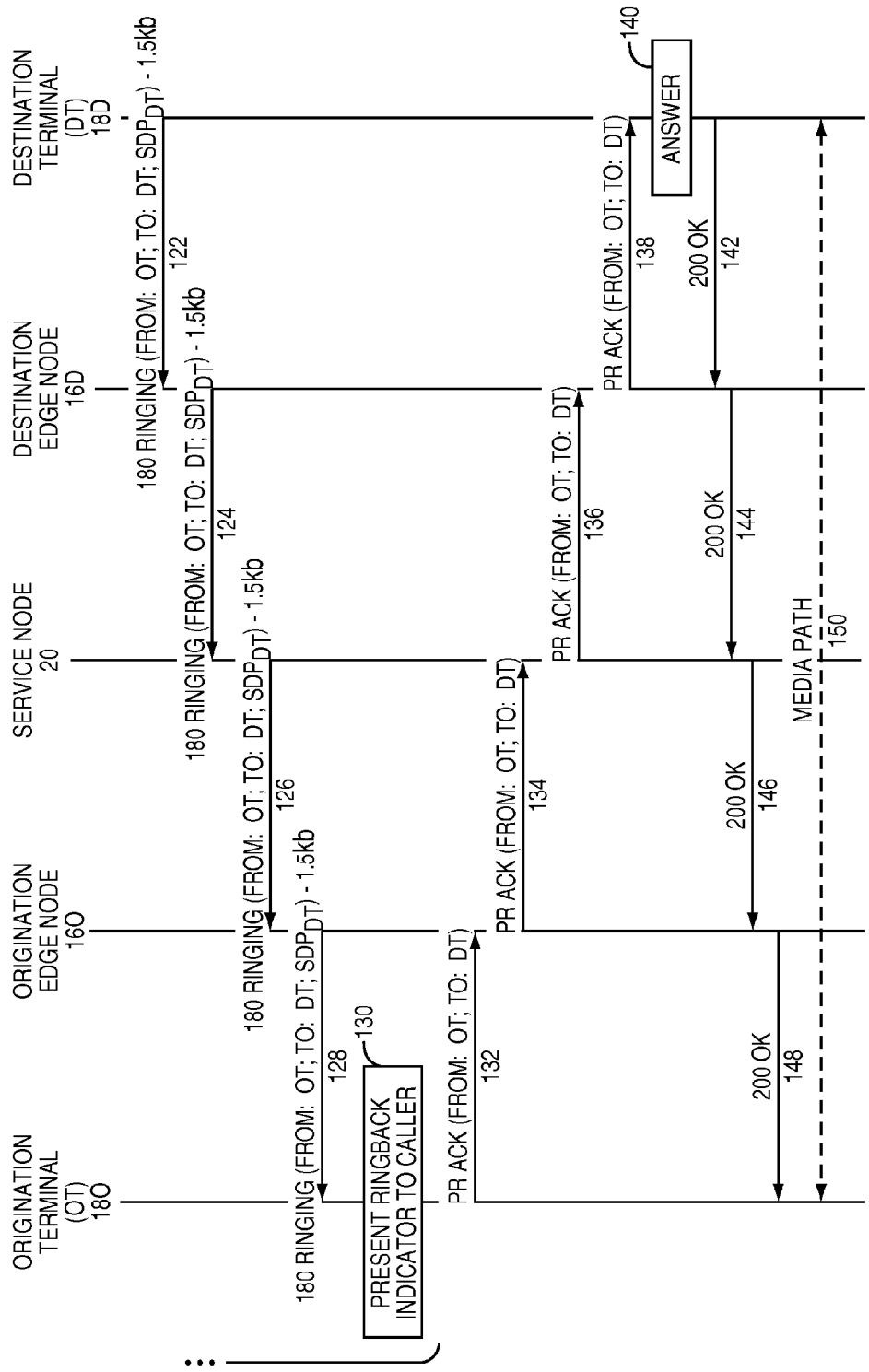

Turning now to FIGS. 2A and 2B, a communication flow for establishing a packet-based communication flow is provided according to the prior art. To initiate a call from the origination terminal (OT) 18O to the destination terminal (DT) 18D (step 100), the origination terminal 18O may send a Request Traffic Channel (TCH) message over the origination radio access network 14O to the origination edge node 16O to request a traffic channel for the packet-based communication session (step 102). The origination edge node 16O will allocate a traffic channel and send a Traffic Channel Granted message back to the origination terminal 18O (step 104). Since the call being established is a packet-based communication session, the origination terminal 18O will take the necessary steps to initiate the packet-based communication session with the destination terminal 18D by sending a SIP Invite message toward the destination terminal 18D. The Invite message is initially sent to the origination edge node 16O (step 106), and will identify the origination terminal 18O as the originating party and the destination terminal 18D as the destination party.

The Invite message will also include the Session Data Protocol (SDP) for the origination terminal 18O ($SDP_{OT}$). The SDP provides the requisite communication information to allow the destination terminal 18D to communicate with the origination terminal 18O. The SDP may include codec (coding/encoding) information, port information, encryption information, and the like. Notably, the Invite message, especially when it includes the SDP information for the origination terminal 18O, is relatively large, and may reach or exceed 2 kilobytes (2 kb). As such, transferring the entire Invite message over the relatively low bandwidth signaling channel provided by the origination radio access network 14O is time consuming and injects significant delay in the initiation process for the packet-based communication session.

The origination edge node 16O will forward the Invite message received from the origination terminal 18O to the service node 20 (step 108), which may further forward the Invite message toward the destination edge node 16D that supports communications with the destination terminal 18D (step 110). Upon receiving the Invite message intended for the destination terminal 18D, the destination edge node 16D will send a Page Request message toward the destination terminal 18D (step 112). The destination terminal 18D will recognize the Page Request as a need to establish communications with the destination edge node 16D, and as such, may send a Page Response and a Request Traffic Channel message to the destination edge node 16D (step 114). The destination edge node 16D will allocate a traffic channel for the destination terminal 18D and send a Traffic Channel Granted message to indicate the same back to the destination terminal 18D (step 116). The destination edge node 16D will then forward the Invite message to the destination terminal 18D (step 118). Again, delivering the Invite message over the signaling channel to the destination terminal 18D is relatively time consuming.

Upon receiving the Invite message, the destination terminal 18D will recognize that a call is being presented from the origination terminal 18O and will begin alerting the called party of the incoming packet-based communication session (or call) (step 120). The destination terminal 18D will then provide a 180 Ringing message to the destination edge node 16D to indicate that the packet-based communication session is being presented to the destination terminal 18D, and that the called party is being alerted (step 122). The 180 Ringing message will provide the SDP information of the destination terminal 18D ($SDP_{DT}$) to enable the origination terminal 18O to communicate with the destination terminal 18D. The 180 Ringing message will also indicate that it is a message for a packet-based communication session originated from the origination terminal 18O, and intended for the destination terminal 18D.

The destination edge node 16D will send the 180 Ringing message to the service node 20 (step 124), which will forward the 180 Ringing message to the origination edge node 16O (step 126). The origination edge node 16O will then forward the 180 Ringing message to the origination terminal 18O over the signaling channel provided by the origination radio access network 14O (step 128). Again, the 180 Ringing message will include the SDP information for the destination terminal 18D, and as such, the 180 Ringing message will be significantly large, perhaps being as large if not larger than 1.5 kilobytes. These large messages take significant time to traverse the signaling channels provided by the respective origination and destination radio access networks 14O, 14D. Upon receiving the 180 Ringing message, the origination terminal 18O will present a ringback indicator to the caller (step 130).

For reference, the time between initiation of the call (step 100) and initially presenting the ringback indicator to the caller (step 130) is approximately 4200 ms (or 4.2 seconds). The time between initiating the call and presenting a ringback indicator to the caller for a traditional cellular call is generally 2 seconds or less. As such, incurring a delay of over 4 seconds between initiating a call and being presented with a ringback indicator triggers many callers to incorrectly conclude that there is a problem with the call they are initiating. Upon forming this errant conclusion, the caller may end the call initiation attempt and immediately reinitiate the call, only to be met with the same delay.

Assuming the caller has sufficient patience to allow the call to proceed, and the called party answers the packet-based communication session at the destination terminal 18D (step 140), the destination terminal 18D will send a 200 OK message to the destination edge node 16D (step 142). The destination edge node 16D will forward the 200 OK message to the service node 20 (step 144), which will forward the 200 OK message to the origination edge node 16O (step 146). The origination edge node 16O will forward the 200 OK message to the origination terminal 18O (step 148), wherein the packet-based communication session may be established over an appropriate media path between the origination terminal 18O and the destination terminal 18D in traditional fashion (step 150).

The present invention employs third party call control (3PCC) technique to effectively initiate the packet-based communication session when the traffic channel is requested, as well as allow establishment of the origination and destination call legs to proceed in parallel. Such action significantly decreases the delay between initiating a packet-based communication session and receiving a ringback indicator, which indicates that a packet-based communication session is being presented to the called party.

Figure 3A:
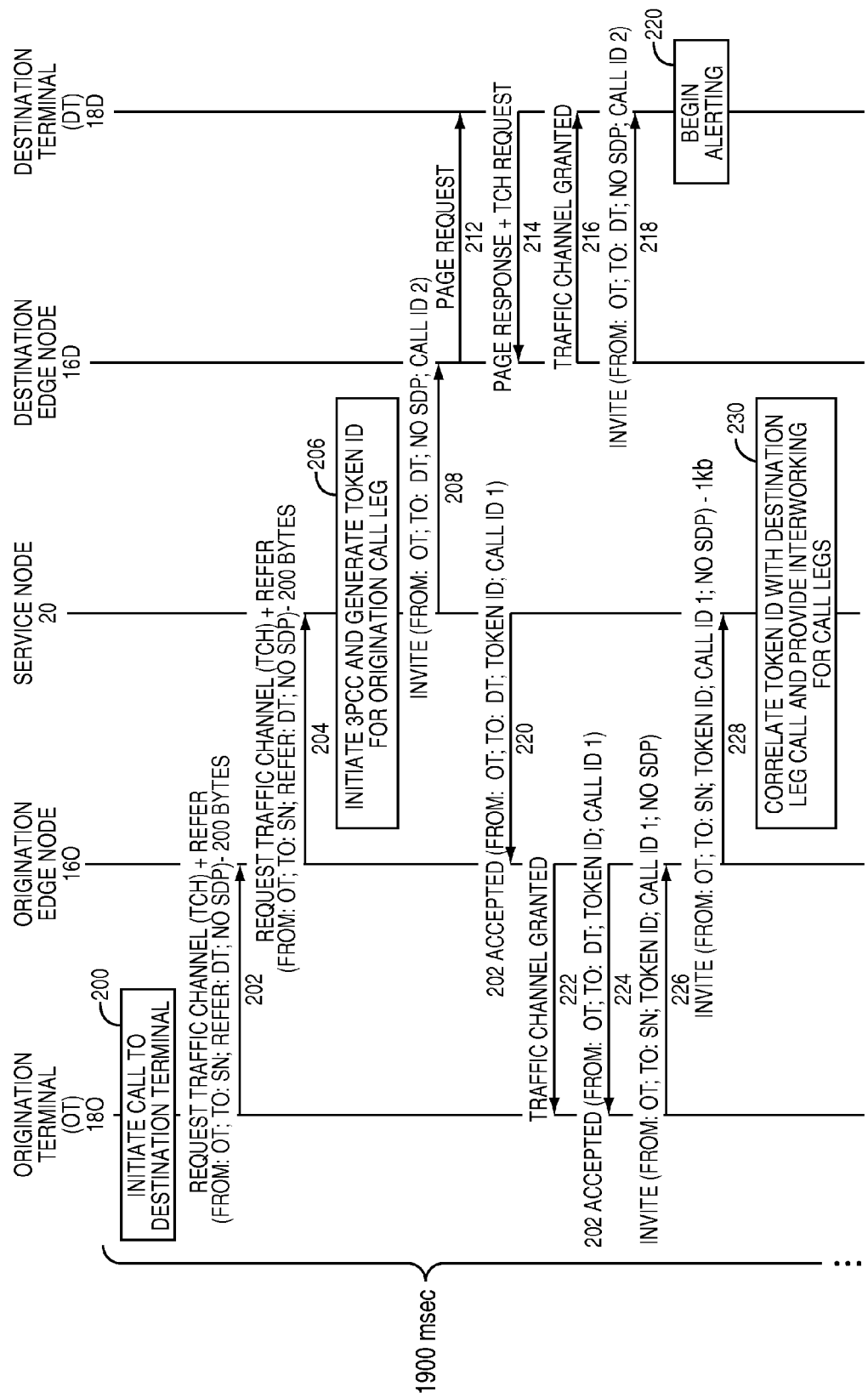
FIGS. 3A and 3B are a communication flow for establishing a packet-based communication session from a mobile terminal according to one embodiment of the present invention.
Figure 3B:
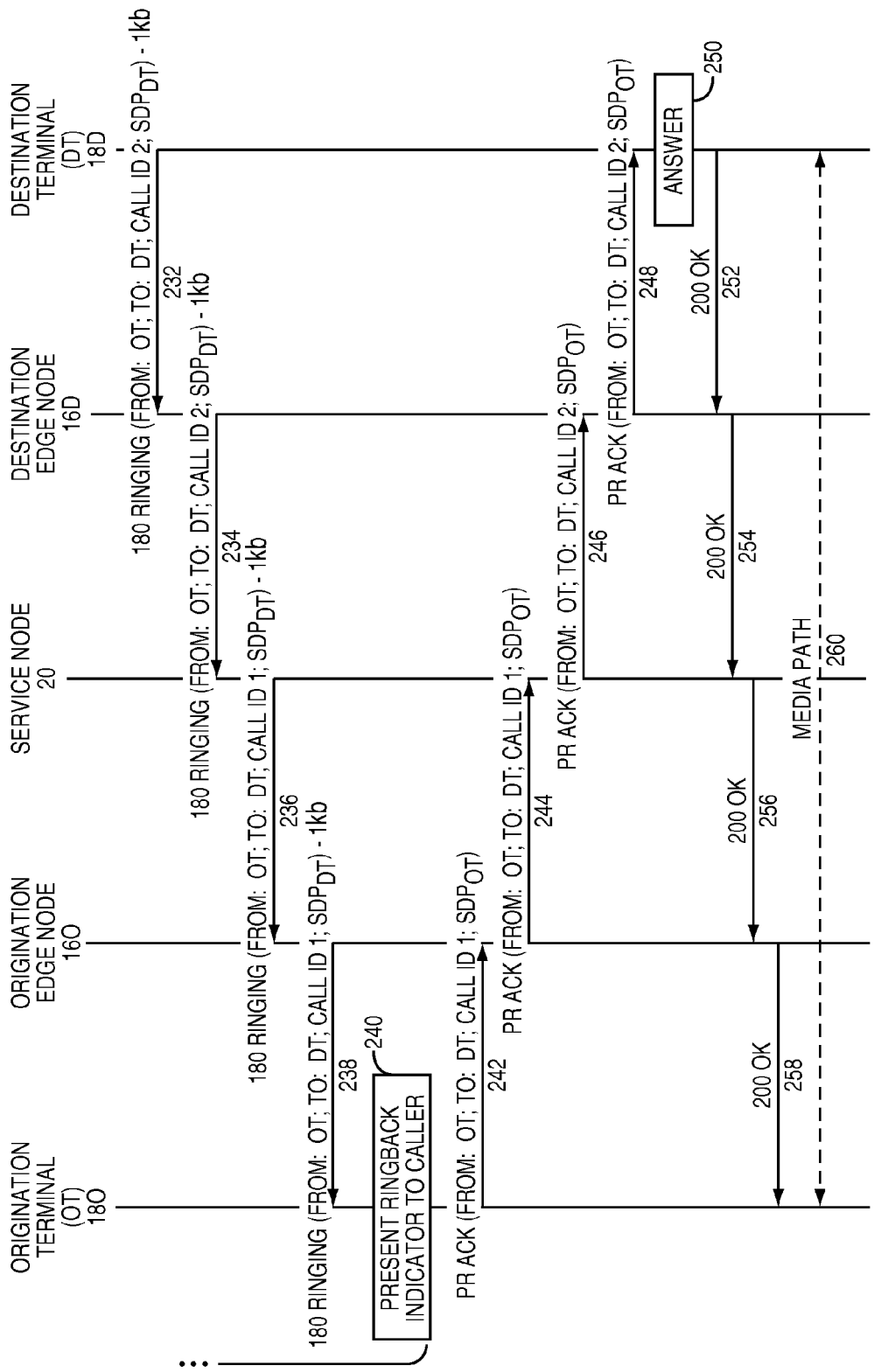

Turning now to FIGS. 3A and 3B, a communication flow is provided to illustrate operation of one embodiment of the present invention. In general, an initiation of a packet-based communication session from the origination terminal 18O to the destination terminal 18D will result in a third party call control message being sent to the service node 20 while a traffic channel is being requested by the origination terminal 18O. The service node 20 will immediately begin establishing a destination call leg toward the destination terminal 18D, as well as establish an origination call leg toward the origination terminal 18O. The service node 20 will effectively connect the origination and destination call legs to enable the origination terminal 18O and the destination terminal 18D to exchange communication information, perhaps using SDP, such that a media path between the origination terminal 18O and the destination terminal 18D may be established for the packet-based communication session. A detailed communication flow is provided below.

The origination terminal 18O will initiate a packet-based communication session (or call) to the destination terminal 18D (step 200) by sending a Request Traffic Channel message and a (SIP) Refer message toward the origination edge node 16O (step 202). The Refer message is a third party call control message that will ultimately instruct the service node 20 to initiate a call from the origination terminal 18O to the destination terminal 18D. The Refer message is intended for the service node 20, and as such, it will indicate that the Refer message is from the origination terminal 18O and intended for the service node (SN) 20. The Refer message will also indicate that the service node 20 should refer the call to the destination terminal 18D. Notably, there is no SDP provided in the Refer message, and as such, the Refer message may be compressed to a relatively small size. For example, the Refer message may be 200 bytes or less. The origination edge node 16O will respond to the Refer message by sending the Refer message to the service node 20 (step 204), which will initiate third party call control and generate a token identifier (ID) for the origination call leg (step 206).

For third party call control, the service node 20 will send an Invite message to the destination edge node 16D indicating that a call is being initiated from the origination terminal 18O to the destination terminal 18D (step 208). The Invite message will not include SDP information, but may identify the destination call leg with an appropriate call identifier (CALL ID 2). Upon receiving the Invite message, the destination edge node 16D may send a Page Request to the destination terminal 18D to indicate that a packet-based communication session is being presented (step 212). The destination terminal 18D may respond with a Page Response as well as a Traffic Channel Request (step 214). The destination edge node 16D will allocate a traffic channel in the destination radio access network 14D for the destination terminal 18D, and will send a Traffic Channel Granted message to the destination terminal 18D (step 216). The destination edge node 16D will then forward the Invite message to the destination terminal 18D (step 218). The destination terminal 18D will recognize that a packet-based communication session is being presented, and will begin alerting the called party (step 220).

While the destination call leg is being established, the service node 20 will complete the 3PCC transaction with the origination terminal 18O by sending a (SIP) 202 Accepted message, or the like, to the origination edge node 16O (step 220). The 202 Accepted message will indicate that a call is being established for the origination terminal 18O to the destination terminal 18D, and will provide the token ID for the origination leg as well as a call ID (CALL ID 1). Notably, each leg may be associated with different call IDs (CALL ID 1 and CALL ID 2). The service node 20 may modify the requisite call signaling to coordinate the respective origination and destination call legs. Further, the token ID will be returned by the origination terminal 18O in a subsequent message to facilitate the service node 20 to correlate the messaging associated with the origination and destination call legs.

The origination edge node 16O will respond to the initial Request Traffic Channel message by allocating a traffic channel in the origination radio access network 14O for the packet-based communication session, and send a Traffic Channel Granted message to the origination terminal 18O (step 222). In response to receiving the 202 Accepted message, the origination edge node 16O will forward the 202 Accepted message to the origination terminal 18O (step 224). Upon receiving the 202 Accepted message, the origination terminal 18O is configured to respond by sending an Invite message to the service node 20 via the origination edge node 16O (steps 226 and 228). The Invite message will provide the call ID (CALL ID 1) and the token ID to enable the service node 20 to correlate the Invite message with the packet-based communication session being established with the destination terminal 18D. By doing so, the origination terminal is attempting to rendezvous with the call already in progress from the service node. The Invite message may not include the SDP for the origination terminal 18O. As such, the Invite message will be relatively small, such as 1 kilobyte or less, and thus traverse the signaling channel between the origination terminal 18O and the origination edge node 16O relatively quickly. Upon receipt of the Invite message, the service node 20 will correlate the token ID provided in the Invite message with the destination call leg, and provide the requisite interworking between the origination and destination call legs (step 230), thus completing the rendezvous step initiated by the origination terminal.

Returning to the destination call leg, a 180 Ringing message is initiated by the destination terminal 18D when alerting begins (step 232). The 180 Ringing message will identify the call ID (CALL ID 2) for the packet-based communication session, as well as the SDP information for the destination terminal 18D (SDP$_{DT}$). Notably, this is the first offering of SDP information among the origination and destination terminals 18O and 18D. The 180 Ringing message will also indicate that the packet-based communication session is being originated from the origination terminal 18O and terminated at the destination terminal 18D.

The destination edge node 16D will receive the 180 Ringing message from the destination terminal 18D and forward the 180 Ringing message toward the service node 20 (step 234). The 180 Ringing message may be approximately 1 kilobyte in size. The service node 20 will provide the requisite interworking between the destination and origination call legs by changing the call ID (CALL ID 2 to CALL ID 1) and modify any other information as necessary to facilitate a fluid communication message exchange between the origination terminal 18O and the destination terminal 18D. As such, the modified 180 Ringing message is forwarded toward the origination terminal 18O via the origination edge node 16O (steps 236 and 238). The origination terminal 18O will receive the 180 Ringing message and the included SDP information for the destination terminal 18D and present a ringback indicator to the caller.

In this example, the ringback indicator is presented to the caller within 1900 ms (1.9 seconds) from the time the caller initiated the packet-based communication session. By comparison with the communication flow of FIGS. 2A and 2B, the ringback indicator is presented to the caller in less than half the time required in the prior art.

Since the origination terminal 18O has not provided its SDP information to the destination terminal 18D, the SDP information of the origination terminal 18O (SDP$_{OT}$) may be provided to the destination terminal 18D in a Provisional Acknowledgement (PR ACK) message. As illustrated, the PR ACK is initially sent from the origination terminal 18O to the origination edge node 16O (step 242), which forwards the PR ACK to the service node 20 (step 244). The service node 20 will modify any information in the PR ACK message, such as the call ID (CALL ID 1 to CALL ID 2), and forward the message toward the destination terminal 18D via the destination edge node 16D (steps 246 and 248). At this point, the destination terminal 18D has the SDP information for the origination terminal 18O. Since the origination and destination terminals 18O and 18D have each other's SDP information, they can effectively communicate with each other.

When the destination terminal 18D is answered by the called party (step 250), the destination terminal 18D may send a 200 OK message toward the origination terminal 18O. The 200 OK message is forwarded through the destination edge node 16D (step 252), service node 20 (step 254), and origination edge node 16O (step 256) en route to the origination terminal 18O (step 258). At this point, a media path is established between the origination terminal 18O and the destination terminal 18D for the packet-based communication session (step 260).

As seen from the above, the present invention allows an origination terminal 18O to initiate a call by providing a third party call control message in association with a traffic channel request. While the traffic channel is being established, the service node 20 may initiate third party call control to initiate call legs to the origination terminal 18O and the destination terminal 18D. As such, the destination call leg is initiated earlier in the process. Since the destination call leg is initiated earlier, a corresponding ringback message indicating that a call is being presented to the called party is provided to the origination terminal 18O sooner. When the ringback message is received quickly, a corresponding ringback indication may be presented to the caller in much less time than was previously possible. The process is made even more efficient by waiting until the ringback message is received from the destination terminal 18D before providing the SDP information, or communication information, for the origination terminal 18O to the destination terminal 18D. As such, the transfer of the relatively data-intensive communication information over the traffic channel signaling paths of the origination and destination radio access networks 14O, 14D does not delay presentation of a call to the destination terminal 18D and receipt of a ringback message at the origination terminal 18O.

Figure 4:
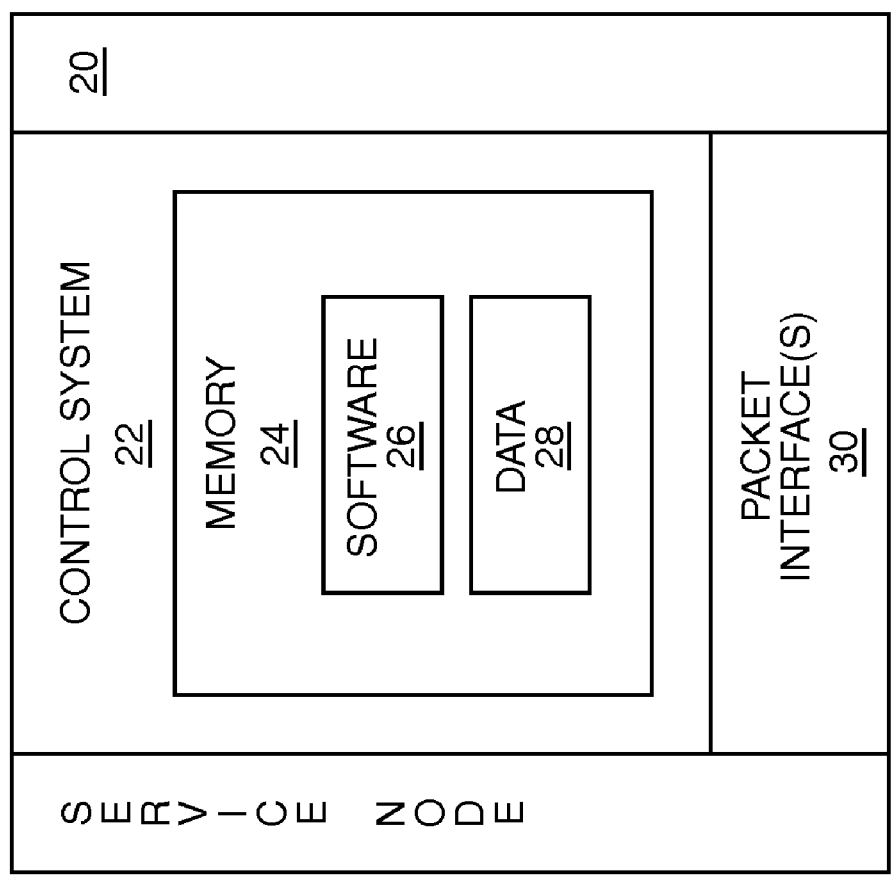
FIG. 4 is a block representation of a service node according to one embodiment of the present invention.

A block representation of a service node 20 is provided in FIG. 4. The service node 20 will include a control system 22 having sufficient memory 24 for the requisite software 26 and data 28 to operate as described above. The control system 22 will be associated with one or more packet interfaces 30 to facilitate communications with various entities over the packet network 12.

Figure 5:
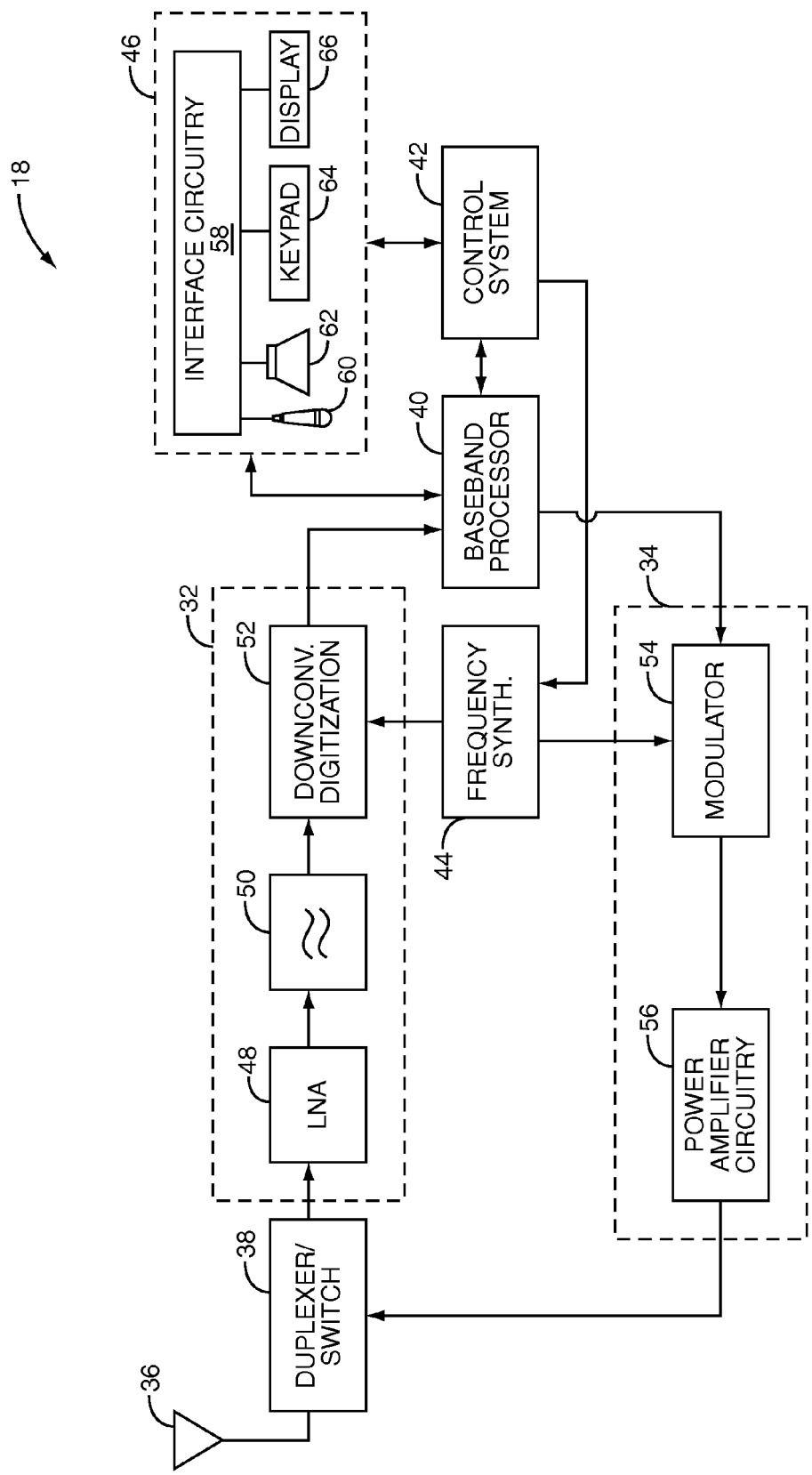
FIG. 5 is a block representation of a mobile terminal according to one embodiment of the present invention.

The basic architecture of a mobile terminal 18, such as the origination or destination terminals 18O and 18D, is provided in FIG. 5. The mobile terminal 18 may include a receiver front end 32, a radio frequency transmitter section 34, an antenna 36, a duplexer or switch 38, a baseband processor 40, a control system 42, a frequency synthesizer 44, and a user interface 46. The receiver front end 32 receives radio frequency signals from one or more remote transmitters provided by a base station in a radio access network 14. A low noise amplifier (LNA) 48 amplifies the signals. A filter circuit 50 minimizes broadband interference in the received signals, while downconversion and digitization circuitry 52 downconverts the filtered, received signals to intermediate or baseband frequency signals, which are then digitized into one or more digital streams. The receiver front end 32 typically uses one or more mixing frequencies generated by the frequency synthesizer 44 to downconvert the received signals the intermediate or baseband signals. The baseband processor 40 processes the digitized streams to extract the information or data bits conveyed in the received signal. This processing typically comprises demodulation, decoding, and error correction operations. As such, the baseband processor 40 is generally implemented in one or more digital signal processors (DSPs).

On the transmit side, the baseband processor 40 receives digitized data, which may represent voice, data, or control information, from the control system 42, which it encodes for transmission. The encoded data is output to the transmitter 34, where it is used by a modulator 54 to modulate a carrier signal having a desired transmit frequency. Power amplifier circuitry 56 amplifies the modulated carrier signal to a level appropriate for transmission, and delivers the amplified and modulated carrier signal to the antenna 36 through the duplexer or switch 38. In addition to providing basic communication control, the control system 42 and other components of the mobile terminal cooperate to provide the functionality of by the present invention, as described above.

A user may interact with the mobile terminal via the interface 46, which may include interface circuitry 58 associated with a microphone 60, a speaker 62, a keypad 64, and a display 66. The interface circuitry 58 typically includes analog-to-digital converters, digital-to-analog converters, amplifiers, and the like. Additionally, it may include a voice encoder/decoder, in which case it may communicate directly with the baseband processor 40. The microphone 60 will typically convert audio input, such as the user's voice, into an electrical signal, which is then digitized and passed directly or indirectly to the baseband processor 40. Audio information encoded in the received signal is recovered by the baseband processor 40, and converted by the interface circuitry 58 into an analog signal suitable for driving the speaker 62. The keypad 64 and display 66 enable the user to interact with the mobile terminal, input numbers to be dialed, address book information, or the like, as well as monitor call progress information.

Those skilled in the art will recognize improvements and modifications to the preferred embodiments of the present invention. All such improvements and modifications are considered within the scope of the concepts disclosed herein and the claims that follow.

What is claimed is:

1. A method comprising:
   receiving a third party control message provided with no session data protocol (SDP) information, said third party control message triggered in response to a mobile terminal sending a channel request associated with an initial control message, the third party control message identifying the mobile terminal and a destination terminal for a session;
   establishing a destination signaling leg toward the destination terminal and an origination signaling leg toward the mobile terminal in response to the third party control message;
   receiving via the destination signaling leg a ringback message indicative of the session being presented to the destination terminal; and
   sending the ringback message toward the mobile terminal via the origination signaling leg.

2. The method of claim 1 wherein establishing the origination signaling leg comprises sending an acceptance message toward the mobile terminal via the origination signaling leg and receiving a session initiation message via the origination signaling leg.

3. The method of claim 1 further comprising generating a token identifier in response to receiving the third party control message, and wherein establishing the origination signaling leg comprises sending an acceptance message with the token identifier toward the mobile terminal via the origination signaling leg and receiving a session initiation message with the token identifier via the origination signaling leg, wherein the token identifier is used to associate the origination signaling leg with the destination signaling leg.

4. The method of claim 1 wherein destination communication parameters necessary for the mobile terminal to send packets toward the destination terminal are provided to the mobile terminal in the ringback message.

5. The method of claim 1 wherein origination communication parameters necessary for the destination terminal to send packets toward the mobile terminal are not provided to the destination terminal until after the ringback message is delivered to the origination terminal.

6. The method of claim 5 wherein destination communication parameters necessary for the mobile terminal to send packets toward the destination terminal are provided to the mobile terminal in the ringback message.

7. The method of claim 1 wherein origination communication parameters necessary for the destination terminal to send packets toward the mobile terminal are provided to the destination terminal in a response message provided by the mobile terminal in response to receiving the ringback message.

8. The method of claim 1 further comprising modifying session identification information in session messages exchanged between the mobile terminal and the destination terminal in association with the session.

9. The method of claim 1 wherein the mobile terminal is provided service via a radio access network, and the session is a packet-based voice communication session supported by the mobile terminal.

10. The method of claim 9 wherein the radio access network is a cellular network.

11. The method of claim 1 wherein the destination signaling leg and the origination signaling leg are established substantially concurrently, such that the session is presented to the mobile terminal and the destination terminal at substantially the same time.

12. A system comprising:
    at least one packet interface; and
    a control system associated with the at least one packet interface and adapted to:
    receive a third party control message provided with no session data protocol (SDP) information, said third party control message triggered in response to a mobile terminal sending a channel request associated with an initial control message, the third party control message identifying the mobile terminal and a destination terminal for a session;
    establish a destination signaling leg toward the destination terminal and an origination signaling leg toward the mobile terminal in response to the third party control message;
    receive via the destination signaling leg a ringback message indicative of the session being presented to the destination terminal; and
    send the ringback message toward the mobile terminal via the origination signaling leg.

13. The system of claim 12 wherein to establish the origination signaling leg, the control system is further adapted to send an acceptance message toward the mobile terminal via the origination signaling leg and receive a session initiation message via the origination signaling leg.

14. The system of claim 12 wherein the control system is further adapted to generate a token identifier in response to receiving the third party control message, and to establish the origination signaling leg, the control system is further adapted to send an acceptance message with the token identifier toward the mobile terminal via the origination signaling leg and receive a session initiation message with the token identifier via the origination signaling leg, wherein the token identifier is used to associate the origination signaling leg with the destination signaling leg.

15. The system of claim 12 wherein destination communication parameters necessary for the mobile terminal to send packets toward the destination terminal are provided to the mobile terminal in the ringback message.

16. The system of claim 12 wherein origination communication parameters necessary for the destination terminal to send packets toward the mobile terminal are not provided to the destination terminal until after the ringback message is delivered to the origination terminal.

17. The system of claim 16 wherein destination communication parameters necessary for the mobile terminal to send packets toward the destination terminal are provided to the mobile terminal in the ringback message.

18. The system of claim 12 wherein origination communication parameters necessary for the destination terminal to send packets toward the mobile terminal are provided to the destination terminal in a response message provided by the mobile terminal in response to receiving the ringback message.

19. The system of claim 12 wherein the control system is further adapted to modify session identification information in session messages exchanged between the mobile terminal and the destination terminal in association with the session.

20. The system of claim 12 wherein the mobile terminal is provided service via a radio access network and the session is a packet-based voice communication session supported by the mobile terminal.

21. The system of claim 20 wherein the radio access network is a cellular network.

22. The system of claim 12 wherein the destination signaling leg and the origination signaling leg are established substantially concurrently, such that the session is presented to the mobile terminal and the destination terminal at substantially the same time.

\* \* \* \* \*